(12) United States Patent
González Mieres et al.

(10) Patent No.: US 10,427,915 B2
(45) Date of Patent: Oct. 1, 2019

(54) METHOD FOR CONTROLLING A TRANSPORT DEVICE, NAMELY AN ESCALATOR OR A MOVING WALKWAY

(71) Applicants: THYSSENKRUPP ELEVATOR INNOVATION CENTER S.A., Gijon (ES); thyssenkrupp AG, Essen (DE)

(72) Inventors: Isabel González Mieres, Gijón (ES); Marcos Pérez Pérez, Oviedo (ES)

(73) Assignees: THYSSENKRUPP ELEVATOR INNOVATION CENTER S.A., Gijon (ES); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/073,543

(22) PCT Filed: Feb. 9, 2017

(86) PCT No.: PCT/EP2017/052844
§ 371 (c)(1),
(2) Date: Jul. 27, 2018

(87) PCT Pub. No.: WO2017/140568
PCT Pub. Date: Aug. 24, 2017

(65) Prior Publication Data
US 2019/0047827 A1 Feb. 14, 2019

(30) Foreign Application Priority Data
Feb. 15, 2016 (EP) .................................... 16380002

(51) Int. Cl.
*B66B 29/00* (2006.01)
*B66B 29/08* (2006.01)
(Continued)

(52) U.S. Cl.
CPC ............ *B66B 29/005* (2013.01); *B66B 21/02* (2013.01); *B66B 25/00* (2013.01); *B66B 29/08* (2013.01); *F16P 3/142* (2013.01); *B66B 27/00* (2013.01)

(58) Field of Classification Search
CPC ........ B66B 29/00; B66B 29/08; B66B 29/005
(Continued)

(56) References Cited

U.S. PATENT DOCUMENTS 6,606,538 B2 * 8/2003 Ponsot .................... B66B 25/00
198/322
7,110,569 B2 * 9/2006 Brodsky ............ G06K 9/00335
348/169

(Continued)

FOREIGN PATENT DOCUMENTS

| CN | 1197762 A | 11/1998 |
| CN | 101386395 B | 3/2009 |

(Continued)

OTHER PUBLICATIONS

English Translation of International Search Report issued in PCT/EP2017/052844, dated Apr. 4, 2017 (dated Apr. 11, 2017).

(Continued)

*Primary Examiner* — James R Bidwell
(74) *Attorney, Agent, or Firm* — thyssenkrupp North America, Inc.

(57) ABSTRACT

A method to control a transport device like a moving walkway or escalator with a control unit includes, generating visual images of a person traveling on the transport device, analyzing movement of the person based on the visual images, and transferring the control unit into a safety modus based on the analysis. The transport device includes a transport area for accommodating a person to be transported, a plurality of transport elements such as movable (Continued)

pallets or movable steps configured to convey the person located in the transport area in a standing manner, a drive adapted for driving the transport elements, and an image recording device for creating visual images of a sector of the transport area. Based on the recorded images a movement of the person within the transport area is analyzed. Based upon a result of the analysis the control unit is transferred into a safety modus.

20 Claims, 4 Drawing Sheets

(51) Int. Cl.
    *B66B 27/00* (2006.01)
    *B66B 21/02* (2006.01)
    *B66B 25/00* (2006.01)
    *F16P 3/14* (2006.01)

(58) Field of Classification Search
    USPC .................................................. 198/322, 323
    See application file for complete search history.

(56) References Cited

U.S. PATENT DOCUMENTS

| | | | | |
|---|---|---|---|---|
| 8,118,152 B2* | 2/2012 | Poyner | ................... | B65G 43/00 198/322 |
| 10,155,642 B2* | 12/2018 | Ghadamossoltani | ........................ | B66B 25/006 |
| 2003/0058341 A1 | 3/2003 | Brodsky | | |
| 2012/0247919 A1* | 10/2012 | Soldner | ................... | B66B 25/00 198/322 |
| 2013/0140134 A1* | 6/2013 | Senger | ................... | B66B 25/00 198/322 |
| 2017/0004675 A1* | 1/2017 | Visser | ................. | G07F 17/3225 |
| 2018/0029838 A1* | 2/2018 | Fang | ....................... | B66B 21/02 |

FOREIGN PATENT DOCUMENTS

| | | |
|---|---|---|
| CN | 101670973 A | 3/2010 |
| CN | 102328870 A | 1/2012 |
| CN | 102722715 A | 10/2012 |
| CN | 204400417 U | 6/2015 |
| DE | 102012109390 A | 4/2014 |
| WO | 2015121751 A | 8/2015 |

OTHER PUBLICATIONS https://en.wikipedia.org/wiki/Optical_flow, Wikipedia, accessed Dec. 2015.

\* cited by examiner

METHOD FOR CONTROLLING A TRANSPORT DEVICE, NAMELY AN ESCALATOR OR A MOVING WALKWAY

CROSS REFERENCE TO RELATED APPLICATIONS

This application is a U.S. National Stage Entry of International Patent Application Serial Number PCT/EP2017/052844, filed Feb. 9, 2017, which claims priority to European Patent Application No. EP 16380002.2, filed Feb. 15, 2016, the entire contents of both of which are incorporated herein by reference.

FIELD

The present disclosure generally relates to methods for controlling transportation devices, including escalators and moving walkways.

BACKGROUND

Escalators and moving walkways (in the following also commonly referred to as "transportation device") are commonly known to transport persons along an ascending/descending (escalator) or horizontal/inclined (moving walkway) path. Escalators comprising steps and moving walkways comprising—pallets (in the following also commonly referred to as "transport means"), which are arranged in a circulating band of transport means. The band of transport means is driven by drive means, most commonly an electromotor.

The safety of the person during transport is to be ensured. Multiple mechanical and electrical safety devices are embedded into the transportation device. The major task of these safety devices is to safeguard people and objects against risks of accidents like extremities from being threaded by the transport means or other moving parts, electrical exposure, etc. However there are still too many accidents in escalators and moving walkways, due to which persons get injured.

According to existing reports, although entrapment—in which a body part or piece of clothing becomes trapped in the gaps between the moving parts of transportation device—is often a high-profile issue because those incidents typically involve small children, falls on and over transportation device account for the majority of all transportation device accidents and often cause more severe injuries and more fatalities.

DE 10 2012 109 390 A1 discloses an observation device for an escalator or a moving walkway using video sensing means. The observation device determines, whether objects or persons are located on the escalator or moving walkway. Upon detection of an object or a person the operation of the escalator or moving walkway can be stopped or a restart of the operation can be prevented.

Thus a need exists for safer moving walkways and escalators.

DETAILED DESCRIPTION

Figure 1:
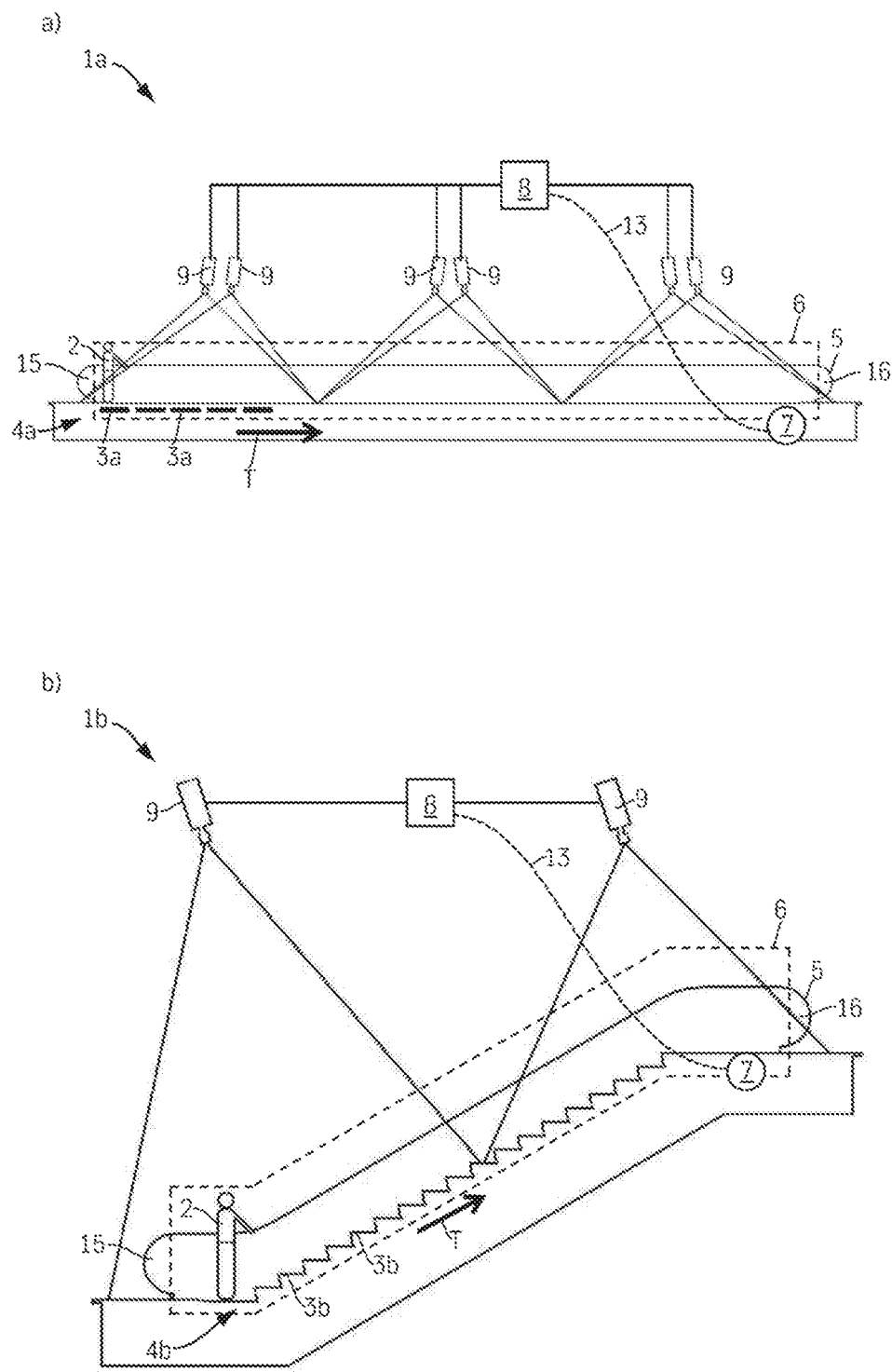
FIG. 1a is a schematic side view of an example transport (or 'transportation') means.
FIG. 1b is a schematic side view of another example transportation means.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention provides for a method for controlling Methods may be employed to control a transport device, namely a moving walkway or an escalator by a control unit, the transport device comprising: that comprises a transport area for accommodating at least one person to be transported; transport means, namely movable pallets or movable steps, adapted for conveying the person located in the transport area in a standing manner; drive means adapted for driving the transport means; and at least one image recording device for creating visual images of least a sector of the transport area. In some example methods, based on the recorded images a movement of the person within the transport is analyzed and based upon the result of the analysis, the control unit is transferred into a safety modus, in particular in which an alarm signal may be triggered or the drive means could be significantly decelerated, in particular stopped or any other status to potentially decrease the risk for the passenger.

Advantageously it is not only detected that a person is located in the transport area, but also the movement of the person is analysed. Based on the analysis of the movement, any fall event can be determined, so that the control unit is transferred into the safety modus, in which the risk of injuries is reduced.

In the safety modus further the control unit may trigger an alarm that could be visual or audible.

In an embodiment a sequence of at least two images of the same person traveling in the transport area are recorded, wherein the two images are analysed regarding differences in the height of the representations of the person in the images. Usually the person is standing or slowly walking in the transport area, so the person is always in an upright position. If the person is falling, the person gets out of the upright position; physically this can be detected, that the representation of the person significantly engages less height in the second image compared to the first image.

In an other embodiment, which may be combined with the previous embodiment, a sequence of at least two images of a person traveling in the transport area are recorded, wherein pixels of a representation of the person are filtered and an optical flow of the pixels is analysed. Usually the person is standing or slowly walking in the transport area, so the person is moving in a constant manner parallel to the transport direction. If areas of the representation of the image abruptly change their directions of movement, this is an indication of a fall accident.

Finally the analyse performs a first evaluation, and if the first evaluation leads to the result, that the person is falling, the control unit is directly transferred into the safety modus. In this case the safety modus is activated as soon as the first evaluation leads to the result that a person is falling.

Alternatively, if the first evaluation leads to the result, that the person is falling, then the control unit is transferred into an intermediate modus; in this intermediate modus, the deceleration of the drive means is in particular less than in the safety modus or an alarm is triggered to alert other passengers about the accident, etc. Further in the intermediate modus it is analysed, if the fallen person is standing up again at a stand up time. If the second evaluation time fulfils a predetermined condition, in particular time condition, in particular if the person is standing up in certain time, then the control unit is transferred back into normal operation modus. Otherwise, if the second evaluation leads not to the result, that is person is standing up, the control unit is transferred into safety modus. Already in the intermediate modus an alarm can be triggered.

In an embodiment, the drive means are operated as following:
  normal operation modus: drive means operated at normal speed;
  intermediate modus: drive means operated at normal speed and/or first alarm triggered;
  safety modus: drive means operated at reduced speed or stopped and/or first or second alarm triggered In another embodiment, the drive means are operated as following:
  normal operation modus: drive means operated at normal speed;
  intermediate modus: drive means operated at reduced speed and/or first alarm triggered
  safety modus: drive means operated at further reduced speed or stopped and/or first or second alarm triggered The second alarm may be triggered in the safety modus, if a first alarm was triggered in the intermediate modus. The second alarm may be different, in particular a more significant alarm, compared to the first alarm.

So in the alternative embodiment, the system waits for certain time in the intermediate modus, before transferring into the safety modus. Thereby the location of the fallen person is, in particular continuously, detected and based on this location a time-left period until the person has reached the exit of the transport means is determined. Then the control unit is transferred into safety modus in case that the second evaluation leads not to the result that the person is standing up, when the time-left period is smaller than a minimum time-left period.

The invention refers further to a transportation device, namely escalator or moving walkway, controlled by the method as described above.

FIG. 1a shows an example of an inventive transport device in the form of a moving walkway 1a. The transport device defines a transport area 6 for accommodating a person 2 to be transported in a transport direction T between an entrance area 15 and an exit area 16. Transport means 3, here in the form of movable pallets 3a, are provided, on which the person 2 stands during transport. The pallets 3a are arranged on a band 4a of pallets 3a, which is driven by an electromotor 7 or any other drive means. During transport the person 2 may grab hold on a handrail 5, which is moving parallel to the transport means 3.

The moving walkway 3a comprises further a number of video cameras 9, which are directed on the transport area 6 for recording images of the transport area 6 and the person 2 in there. The cameras 9 are connected to a control unit 8, which is adapted to analyze the recorded images, as explained subsequently. The control unit 8 can be connected by a wired or wireless data connection 13 to a transport device control 47 which is capable of stopping the drive means 7 by issuing a respective stop order to the drive means 7 or triggering alarm commands to other transport device components (buzzers, lighting appliances, etc.). Issuing the stop order may be realized by outputting an explicit "stop" signal or by terminating an "enabling" signal, which is outputted previously. The transport area, or at least sections of the transport area constitutes an observation area, which is observed by the cameras 9. The control unit may include a tracking module able to identify a person that is detected in the current image and has been detected into previous images as the same person. The control unit may be understood as an assembly of one more control sub-units, in particular a first control sub-unit for analyzing the images and a second control sub-unit for controlling the drive means.

FIG. 1b shows another embodiment of the invention. Here, the transport device is an escalator 1b. Instead of the pallets the transport means are steps 3b, which are arranged on a band 4b of steps. The remaining description of the moving walkway of FIG. 1a is completely applicable to the escalator of FIG. 1b.

The inventive method will be explained in more detail with the help of the FIG. 2 to FIG. 6, and is identically applicable to escalators and moving walkways.

Figure 2:
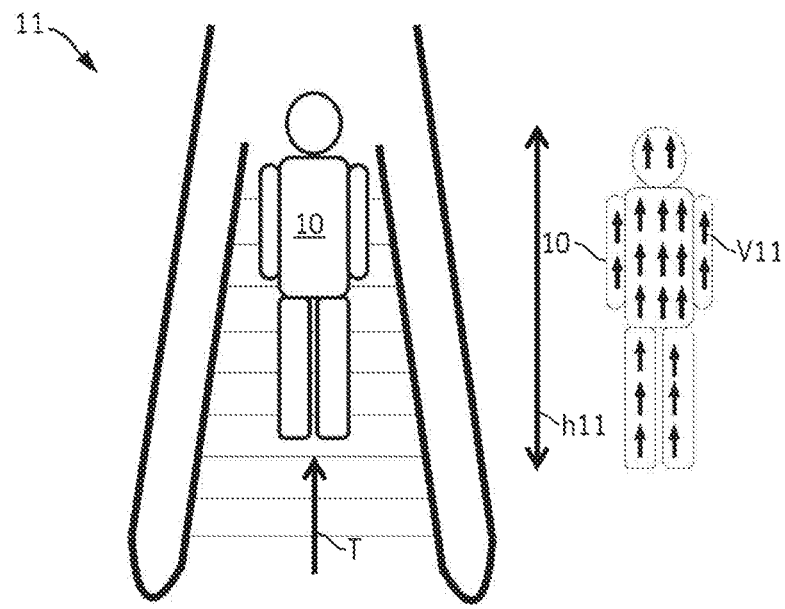
FIG. 2 is a schematic view of a first representation of a person during transport.

FIG. 2 shows a first image 11, recorded by a camera 9, showing a representation 10 of the person traveling on the transport device in transport direction T. From the first image a first height h11 of the representation 10 can be calculated by using usual commercially available image evaluation tools or specific machine algorithms.

Figure 3:
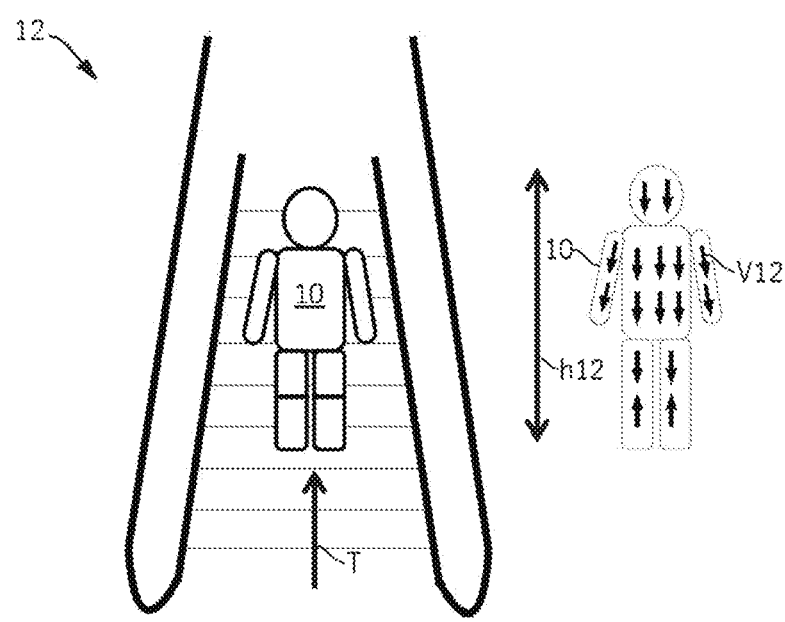
FIG. 3 is a schematic view of a second representation of a person during transport.

FIG. 3 shows a second image 12, recorded by a camera 9 at later time, showing another representation 10 of the same person traveling on the transport device in transport direction T. From the second image a second height h12 of the representation 10 can be calculated by using commercially available image evaluation tools or specific machine algorithms.

The second height h12 is compared to the first height h11 of the representation. If the second height is significantly smaller than the first height h12, it is detected in a first evaluation, that the person is fallen on the ground (evaluation by height comparison).

Another possibility for performing the first evaluation is to analyze the flow of pixels of the representation 10 between the two images. Therefore at least parts of the representations 10 are braked broken down to pixels, wherein the flow of the pixels between in a sequence of images is analyzed. Using the optical flow is a commonly known method in image data processing (see also https://en.wikipedia.org/wiki/Optical_flow).

If the flow of the pixels, as shown in FIG. 2 by vectors V11, are in the same direction as the transport direction T, no hint for a falling person is given. But if a significant number of the pixels, as shown in FIG. 2 by vectors V12, flow in a contrary direction to the transport direction T, a falling person is detected (evaluation by flow analyse).

To perform the prescribed evaluation methods it is preferable, that the line of sight of the cameras onto the observation area have a horizontal component, in particular to better detect any motion parameters of the person in a vertical direction.

Figure 4:
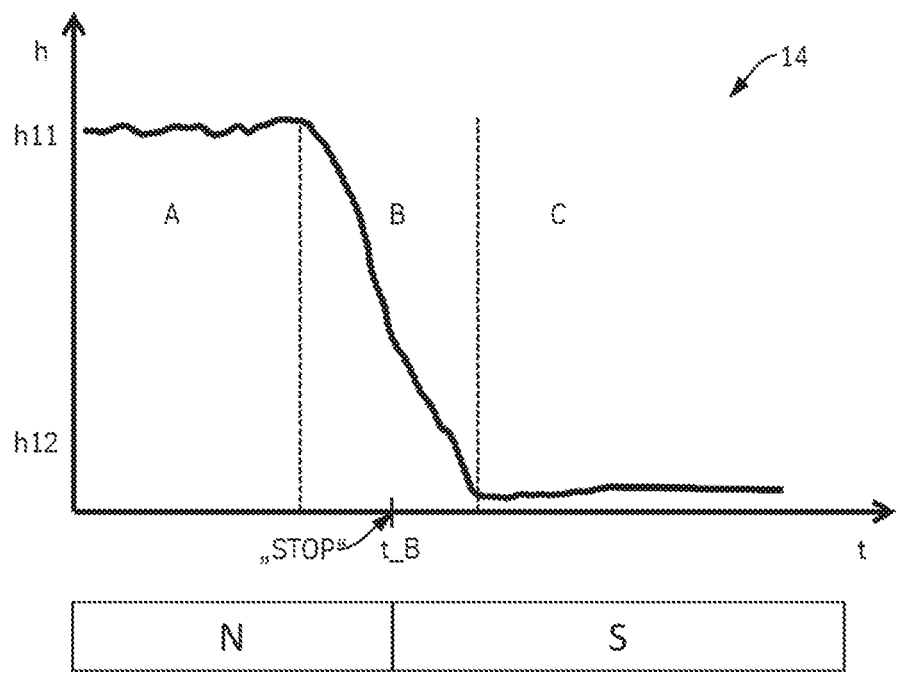
FIG. 4 shows a first time-diagram of the representation of the person.

In FIG. 4 a height over time diagram 14 is shown. In a section A, the height h is nearly constant, which is an indication that the person is traveling in a standing position. In section B the detected height h significantly decreases. When the decreasing height reaches a certain amount at time t_B, the fall of a person is detected (first evaluation). Now the drive unit switches into a safety modus S. In an embodiment of the invention the drive means are stopped immediately. In another embodiment the drive means are decelerated or alarm is triggered. In section C the determined height is still low at h12, so that the evaluation comes to the conclusion that the person is still lying on the ground.

Figure 5:
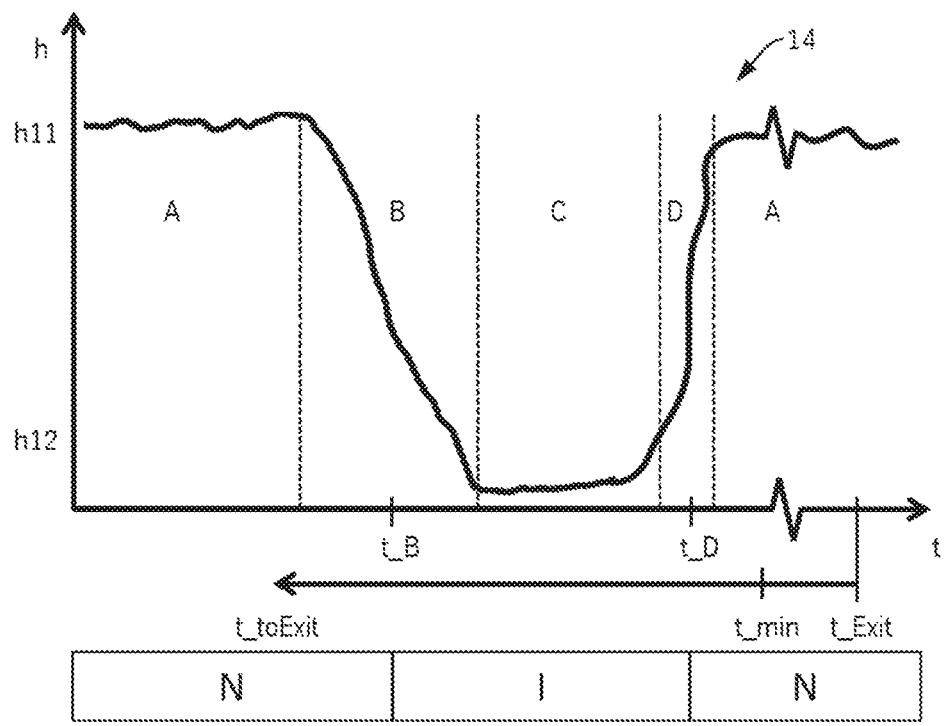
FIG. 5 shows a second time-diagram of the representation of the person.

In FIG. 5 another height over time diagram 14 is shown. In a section A, the height is nearly constant, which is an indication that the person is traveling in a standing position. In section B the detected height significantly decreases. When the decreasing height reaches a certain amount at time t_B, the fall of a person is detected (first evaluation). Now the drive unit switches at first into an intermediate modus I. In this embodiment of the invention the drive means are not stopped immediately. Rather the drive means are decelerated smoothly or alarm is triggered and the system waits some time, if the person stands up. In the section C, no significant increase in the height of the representation is determined. But in section D, the height significantly increases, so the second evaluation leads to the result, that the person is standing up. So there is no necessity to stop or further decelerate the drive means. The control unit now switches back to normal operation modus N.

However this waiting period is only applicable if the person has a sufficient distance to the exit area 16 of the transport device. Therefore a time t_toExit until the person has reached the exit area 16 at a time t_Exit is calculated, which is continuously reducing. If the time t_toExit is larger than a predetermined minimum value t_min, there is still a safe distance between the person and the exit area 16. In this case the system waits for the person to stand up. If the time t_toExit decreases below the minimum value t_min, a safety distance between the person and the exit area is not given anymore. Now the control unit switches finally into safety modus S and reduces massively the drive speed or stops the drive means.

Figure 6:
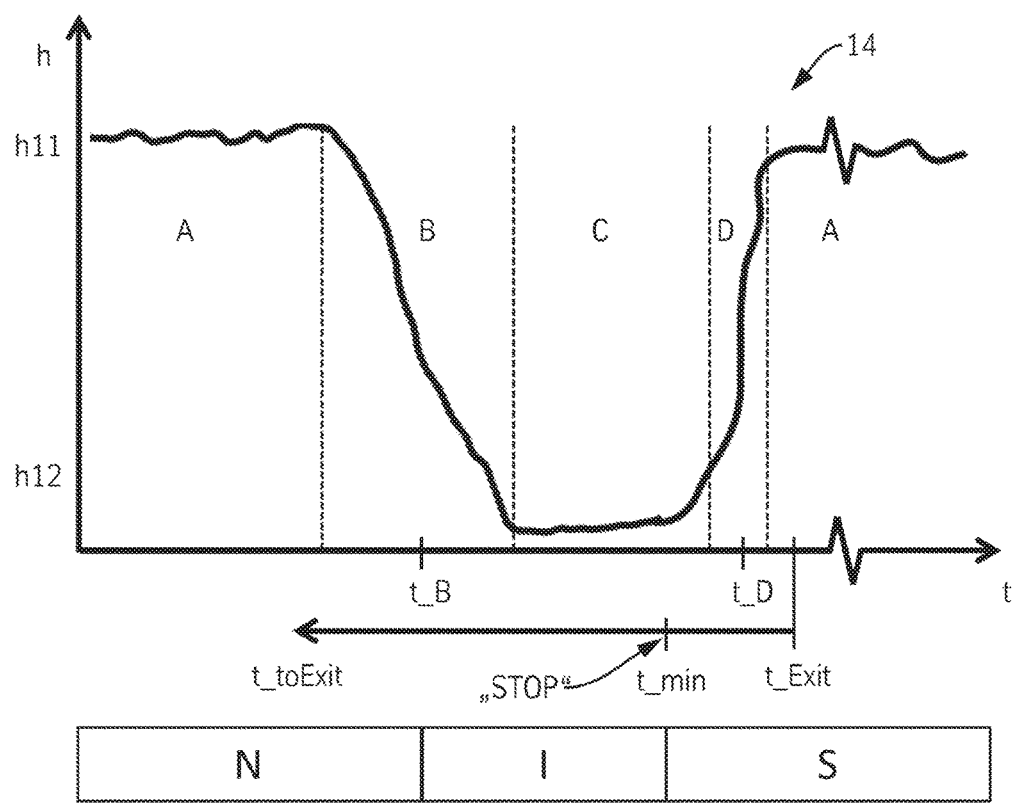
FIG. 6 shows a third time-diagram of the representation of the person.

So if in the intermediate modus a second evaluation result at the time t_D the person is standing up before the time t_toExit has decreased below the minimum value t_min, then the drive means are not stopped (FIG. 5) but the control unit is switched into normal operation modus N. But if the second evaluation at a time t_D has not result in the person standing up before the time t_toExit has decreased below the minimum value t_min, then the control unit switches into safety modus S and the drive means 7 are stopped or decelerated significantly (FIG. 6).

The evaluation by height comparison and the evaluation by flow analyse can be combined to perform the first and/or second evaluation. Further for performing the second evaluation can be performed with the same principal method as the first evaluation is performed, but only in reversed manner.

LIST OF REFERENCE NUMBERS AND DESIGNATIONS 1 moving walkway/escalator
2 person
3 pallet/step
4 band of pallets/steps
5 handrail
6 transport area
7 drive motor
8 control unit
9 video camera
10 representation of person in image
11 first image
12 second image
13 data connection
14 height-over-time diagram
15 entrance
16 exit
T transport direction
V Vector of pixels
h height of representation of person
N normal operating modus
I intermediate operating modus
S safety modus

What is claimed is:

1. A method for controlling a transportation device with a control unit, the transportation device including a transport area for accommodating a person to be transported, transport means adapted for conveying the person in the transport area in a standing manner, drive means adapted for driving the transport means, and an image recording device for generating visual images of a sector of the transport area, the method comprising:
   generating with the image recording device the visual images, which include a sequence of at least two visual images of the person traveling in the transport area;
   analyzing a movement of the person within the transport area based on the visual images by filtering pixels of a representation of the person and analyzing an optical flow of the pixels; and
   transferring the control unit into a safety modus based on the analysis of the movement of the person.

2. The method of claim 1, wherein the step of analyzing a movement of the person further comprises performing a first evaluation that leads to a result, and transferring the control unit into the safety modus if the result indicates that the person is falling or has fallen.

3. The method of claim 1, wherein the step of analyzing a movement of the person further comprises performing a first evaluation that leads to a result, and transferring the control unit into an intermediate modus if the result indicates that the person is falling or has fallen at a falling time.

4. The method of claim 1, wherein the step of analyzing a movement of the person further comprises performing a first evaluation that leads to a result, and transferring the control unit into an intermediate modus if the result indicates that the person is falling or has fallen.

5. The method of claim 1, wherein the analyzing further comprises comparing heights of representations of the person in the at least two visual images.

6. A method for controlling a transportation device with a control unit, the transportation device including a transport area for accommodating a person to be transported, transport means adapted for conveying the person in the transport area in a standing manner, drive means adapted for driving the transport means, and an image recording device for generating visual images of a sector of the transport area, the method comprising:
  generating with the image recording device the visual images, which include a sequence of at least two visual images of the person traveling in the transport area;
  analyzing a movement of the person within the transport area based on the visual images by filtering pixels of representations of the person in the at least two visual images and analyzing an optical flow of the pixels; and
  transferring the control unit into a safety modus based on the analysis of the movement of the person.

7. The method of claim 6, wherein the analyzing further comprises comparing heights of representations of the person in the at least two visual images.

8. The method of claim 6, wherein the step of analyzing a movement of the person further comprises performing a first evaluation that leads to a result, and transferring the control unit into the safety modus if the result indicates that the person is falling or has fallen.

9. The method of claim 6, wherein the step of analyzing a movement of the person further comprises performing a first evaluation that leads to a result, and transferring the control unit into an intermediate modus if the result indicates that the person is falling or has fallen at a falling time.

10. The method of claim 6, wherein the step of analyzing a movement of the person further comprises performing a first evaluation that leads to a result, and transferring the control unit into an intermediate modus if the result indicates that the person is falling or has fallen.

11. A method for controlling a transportation device with a control unit, the transportation device including a transport area for accommodating a person to be transported, transport means adapted for conveying the person in the transport area in a standing manner, drive means adapted for driving the transport means, and an image recording device for generating visual images of a sector of the transport area, the method comprising:
  analyzing a movement of the person within the transport area based on the visual images, by:
    performing a first evaluation that leads to a result, and transferring the control unit into an intermediate modus if the result indicates that the person is falling or has fallen;
  transferring the control unit into a safety modus based on the analysis of the movement of the person; and
  performing a second evaluation when the control unit is in the intermediate modus, wherein:
    if the second evaluation leads to a result that indicates that the person is standing up at a stand up time and if a predetermined time condition is fulfilled, the control unit is transferred into a normal operation modus, and
    if the second evaluation leads to a result that indicates that the person is not standing up at the stand up time the control unit is transferred into or maintained in the safety modus.

12. A method for controlling a transportation device with a control unit, the transportation device including a transport area for accommodating a person to be transported, transport means adapted for conveying the person in the transport area in a standing manner, drive means adapted for driving the transport means, and an image recording device for generating visual images of a sector of the transport area, the method comprising:
  analyzing a movement of the person within the transport area based on the visual images, by:
    performing a first evaluation that leads to a result, and transferring the control unit into an intermediate modus if the result indicates that the person is falling or has fallen;
  transferring the control unit into a safety modus based on the analysis of the movement of the person;
  detecting a location of the person, who has fallen; and
  determining a time-left period until the person reaches an exit of the transport means based on the location of the person.

13. A method for controlling a transportation device with a control unit, the transportation device including a transport area for accommodating a person to be transported, transport means adapted for conveying the person in the transport area in a standing manner, drive means adapted for driving the transport means, and an image recording device for generating visual images of a sector of the transport area, the method comprising:
  analyzing a movement of the person within the transport area based on the visual images, by:
    performing a first evaluation that leads to a result, and transferring the control unit into an intermediate modus if the result indicates that the person is falling or has fallen;
  transferring the control unit into a safety modus based on the analysis of the movement of the person; and
  performing a second evaluation when the control unit is in the intermediate modus, wherein:
    if the second evaluation leads to a result that indicates that the person is standing up and if a predetermined time condition is fulfilled, the control unit is transferred into a normal operation modus, and
    if the second evaluation leads to a result that indicates that the person is not standing up the control unit is transferred into or maintained in the safety modus.

14. The method of claim 13, further comprising:
  detecting a location of the person, who is not standing up based on the second evaluation;
  determining a time-left period until the person reaches an exit of the transport means based on the location of the person; and
  transferring the control unit into the safety modus if the time-left period is less than a predetermined period.

15. The method of claim 13, further comprising:
  detecting a location of the person, who has fallen; and
  determining a time-left period until the person reaches an exit of the transport means based on the location of the person.

16. A transportation device comprising:
  a transport area for accommodating a person to be transported;
  transport means configured to convey the person in the transport area in a standing manner;
  drive means operatively engaged with and configured to drive the transport means; and
  an image recording device configured to generate visual images of a sector of the transport area; and
  a control unit configured to,
    analyze a movement of the person in the transport area based on the visual images generated by the image recording device, by filtering pixels of a representation of the person and analyzing an optical flow of the pixels, and
    switch into a safety modus based on the analysis of the movement of the person.

17. The transportation device of claim 16, wherein the control unit is further configured to decelerate the drive means or to trigger an alarm based on the analysis of the movement of the person.

18. The transportation device of claim 16 configured as a moving walkway.

19. The transportation device of claim 16 configured as an escalator.

20. The transportation device of claim 16 wherein the transport means comprises movable pallets or movable steps.

* * * * *